US006766994B2

(12) United States Patent
Serbinski et al.

(10) Patent No.: US 6,766,994 B2
(45) Date of Patent: Jul. 27, 2004

(54) STABILIZED FLAT PANEL TOUCH MONITOR

(75) Inventors: Andrew Serbinski, Annandale, NJ (US); Jason C. Billig, Hoboken, NJ (US); Mirzat Koc, Brooklyn, NY (US); Mark I. Rosen, Franklin Lakes, NJ (US); David P. Henry, Methuen, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/117,386

(22) Filed: Apr. 5, 2002

(65) Prior Publication Data

US 2003/0189155 A1 Oct. 9, 2003

(51) Int. Cl.⁷ .............................................. A47G 29/00
(52) U.S. Cl. .................... 248/371; 248/299.1; 248/921; 248/923
(58) Field of Search .............................. 248/371, 299.1, 248/292.14, 920–923; 345/173

(56) References Cited

U.S. PATENT DOCUMENTS

| | | | | |
|---|---|---|---|---|
| 1,050,321 A | * | 1/1913 | Winzenburg | 359/860 |
| 1,271,596 A | * | 7/1918 | Mayer | 174/161 R |
| 3,731,897 A | * | 5/1973 | Price | 248/230.1 |
| 4,669,694 A | * | 6/1987 | Malick | 248/397 |
| 5,831,696 A | | 11/1998 | Sheng | |
| 5,833,183 A | * | 11/1998 | Chang | 248/176.1 |
| D404,381 S | * | 1/1999 | Roderman et al. | D14/375 |
| 5,915,658 A | * | 6/1999 | Sheng | 248/346.06 |
| 6,076,846 A | * | 6/2000 | Clardy | 280/290 |
| 6,288,891 B1 | | 9/2001 | Hasegawa et al. | |
| 6,411,271 B1 | * | 6/2002 | Bang et al. | 345/87 |

FOREIGN PATENT DOCUMENTS

| | | |
|---|---|---|
| JP | 63104125 | 5/1988 |
| JP | 09138655 | 5/1997 |
| JP | 10198283 | 7/1998 |
| JP | 2000244146 | 9/2000 |

* cited by examiner

*Primary Examiner*—Korie Chan
(74) *Attorney, Agent, or Firm*—Robert J. Pechman (57) ABSTRACT

The present invention relates to a monitor with touch sensor capabilities having enhanced stability features. One embodiment of the invention is a monitor with touch input capabilities that includes a monitor panel, a base, an upper support member, and a lower support member. The upper support member is secured to the monitor panel at first and second locations, and is further secured to the base. The lower support member is secured to the panel at third and fourth locations that are lower relative to the first and second positions. The lower support member is also secured to the base. In some embodiments of the invention, the upper support member is adjustable to allow the monitor panel to rotate about the lower support member from an upright position to an angled position relative to the base.

5 Claims, 9 Drawing Sheets

STABILIZED FLAT PANEL TOUCH MONITOR

Some embodiments of the present invention are shown in commonly assigned co-pending U.S. Design Patent Application filed even date herewith, application number unknown, our docket 57312US002, entitled FLAT PANEL MONITOR STAND, which is hereby incorporated herein by reference in its entirety.

This invention relates to monitors and monitor stands. The invention more particularly relates to a monitor stand for a monitor with touch input capabilities.

BACKGROUND

Monitors, particularly desktop computer monitors, typically include a stand with a base unit and an attachment feature such as a monitor stand to secure the monitor to the base. Known monitor stands often implement a pivoting feature that allows the monitor to pivot relative to the base unit to adjust the direction in which a screen of the monitor faces. For example, a vertical pivoting feature allows the monitor to move up and down between a generally upright position, typically perpendicular to the base unit, and a position angled relative to the upright position.

One drawback of known monitor stands is the limited angle through which the monitor can rotate. For example, many monitors rotate back from an upright position only about 30 degrees, and most monitors have an even more limited forward rotation from upright, for example, 0 to 15 degrees. A limited backward rotation makes viewing the monitor from above, as required by some monitor applications, very difficult or impossible. However, a limited rotation of the monitor can provide stability of the monitor given the design of known monitors and monitor stands.

Another disadvantage of known monitors relates to the stability of monitors with touch sensor capabilities, whether the touch sensor capabilities are built into the monitor when manufactured or added to the monitor after manufacture. Monitors with touch sensor capabilities inherently require touch forces to activate the touch sensors associated with the monitor screen. Touch inputs can create various stability issues in the monitor and monitor stand depending on the location of the touch on the screen, the direction in which the touch is applied to the screen, and the force with which the touch is applied. Touch inputs applied to the monitor screen when the monitor is at a rotated position can create additional stability issues. Also, repetitious touches and single touches at certain locations may cause vibrations and resonant oscillations that affect stability and usability of the monitor. A monitor and monitor stand that address these and other disadvantages of known monitor stands would be an advance in the art.

SUMMARY OF THE INVENTION

Generally, the present invention relates to a monitor with touch sensor capabilities having enhanced stability features. One embodiment of the invention is a monitor with touch input capabilities that includes a monitor panel, a base, an upper support member, and a lower support member. The upper support member is secured to the monitor panel at first and second locations, and is further secured to the base. The lower support member is secured to the panel at third and fourth locations that are lower relative to the first and second positions. The lower support member is also secured to the base. In some embodiments of the invention, the upper support member is adjustable to allow the monitor panel to rotate about the lower support member from an upright position to an angled position relative to the base.

The invention also provides for a method of pivotally mounting a monitor to a monitor stand. The monitor stand includes a base member, an upper support member with first and second portions that adjustably engage each other, and a lower support member. According to the method, the first portion of the upper support member is secured to the monitor at first and second locations, and the second portion of the upper support member is secured to the monitor at third and fourth locations. In a further step, the monitor pivots about the lower support member by adjusting the first and second upper support members relative to each other.

The above summary of the present invention is not intended to describe each disclosed embodiment or every implementation of the present invention. The Figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, wherein like numerals represent like parts throughout several views, in which.

While the invention is amenable to various modifications in alternative forms, the specifics thereof have been shown by way of example in the drawings and will be described in detail. It should be understood, however, that the intention is not to limit the invention of the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is generally applicable to monitors with increased stability. The invention is particularly related to flat panel monitor assemblies having touch screens with touch sensor capability. The monitor assembly is stable in an upright position when touch inputs are entered at any location on the touch screen and when successive touches are entered on the touch screen. The monitor assembly also maintains stability when touch inputs are entered on the touch screen when the monitor panel is tilted at angles relative to a base portion of the monitor assembly.

"Touch inputs" as used herein refers to a touch to a touch screen that generates a touch signal capable of recognition by a touch system. A touch signal may be generated by a proximity touch input such that the signal is created without actually touching the touch screen. However, it is most common that a touch signal is created with a physical touch input to the touch screen. Typically, the amount of force required to induce a touch signal in a touch sensor ranges from about 3 to 10 oz. (85 to 280 g) over the area of an average fingertip. The average amount of force actually used to generate a touch signal in normal use of touch screens is about 10 to 20 oz. (255 to 510 g). Depending on the application, the user, and other variables, the touch forces that can be expected to be applied can range from as little as 3 oz. to as much as 5 lbs. (85 g to 2.3 kg) over the area provided by a finger tip. The present invention provides monitor assemblies that are stable within the normal or expected ranges of touch forces given the anticipated use of the monitor, and may be stable when even greater forces are applied to the touch screen of the monitor panel. An upper limit on the amount of force that can be applied to the touch screen to generate a touch signal while maintaining stability in the monitor assembly may the point at which the monitor begins to tip over, slide on its support surface, or twist.

For purposes of this application, it will be assumed that a touch input to a touch screen of a monitor panel may be made at any location on an active area of the touch screen. In many cases, the active area of the touch screen covers the viewable area of the monitor panel, or major portion thereof, which in turn often covers the majority of the surface area of the front side of the monitor panel. It is further assumed for purposes of this application that a touch input may be made at or near the top and bottom corners and the top center of the front surface of a monitor panel to which the touch screen is mounted.

Further, when a monitor panel is described herein as being in an "upright" position, the monitor is assumed to be at a generally perpendicular orientation relative to a base of the monitor. Thus, when the monitor panel is described as being "angled relative to the monitor base," the orientation of the monitor panel is one other than an "upright" position. The present invention, as described below, addresses the adjustability and stability of a monitor, preferably a flat panel monitor, which utilizes a touch screen for receiving touch inputs.

Figure 1:
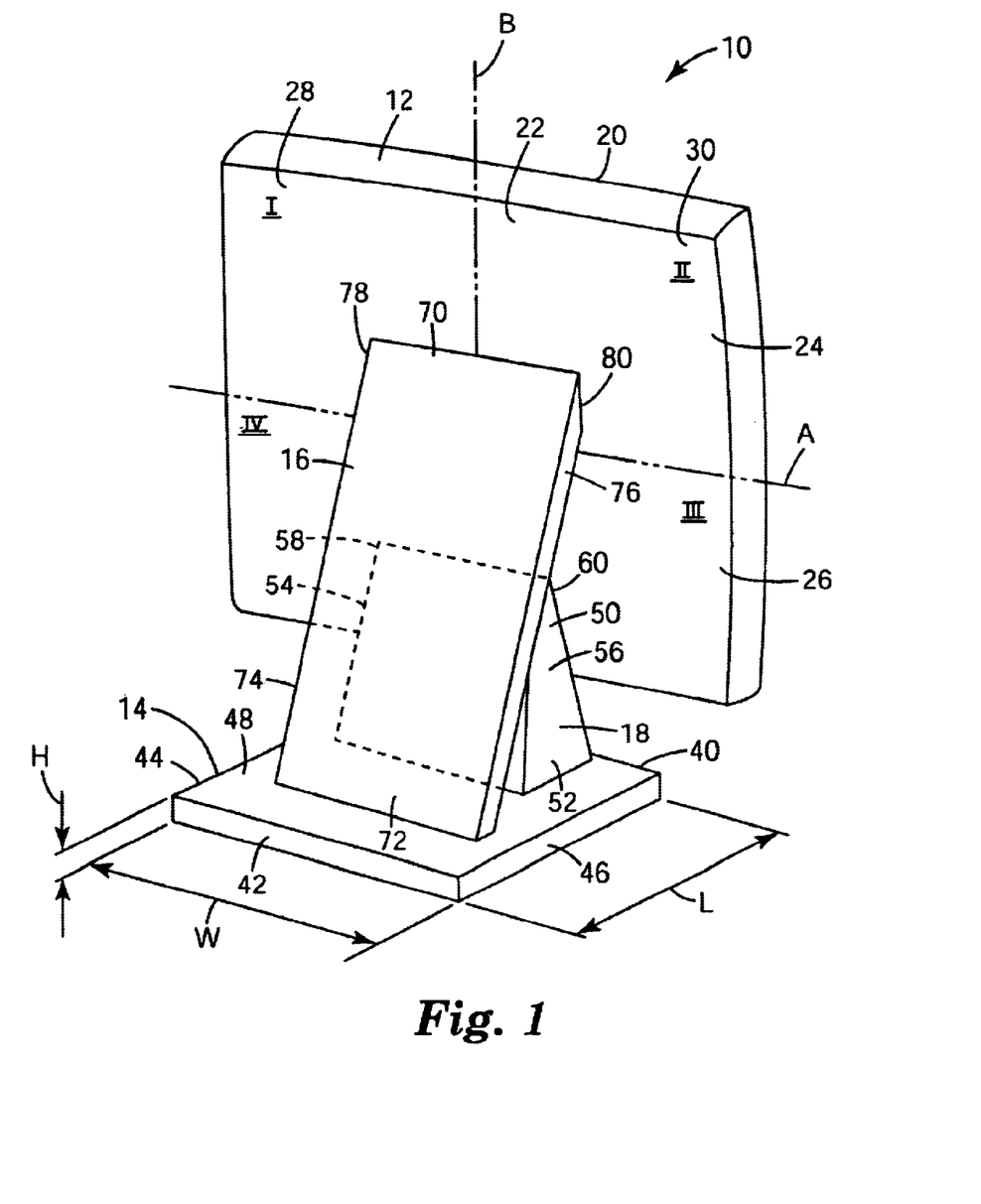
FIG. 1 is a rear perspective view of a monitor assembly according to the invention.

Now referring to the rear perspective view of FIG. 1, one example of a monitor assembly 10 of the present invention includes a monitor panel 12, a monitor base 14, an upper support member 16, and a lower support member 18. Monitor panel 12 is secured to base 14 through the support members at four or more attachment points on the monitor panel to create a four point attachment configuration. A four point attachment configuration is advantageous in many respects over a attachment configuration that use fewer points and that are common in known monitor assemblies. A four point attachment configuration may improve stability of the monitor assembly and reduce vibrations and resonant oscillations in the monitor assembly through improved damping of vibrations.

In the embodiment shown in FIG. 1, upper and lower support members 16 and 18 are fixed in a particular position on both the monitor panel 12 and monitor base 14. In alternative embodiments, the attachment position of the upper and lower support members to either the monitor panel 12 or monitor base 14 may be adjustable, movable, or in some way configured to allow the position of monitor panel 12 to be adjusted relative to the position of base 14.

Monitor panel 12 is a "flat panel" monitor that utilizes technology that requires very little monitor depth (the distance between front and rear surfaces of the monitor panel) for the monitor components. For example, monitor panel 12 may include a liquid crystal display (LCD) screen, a plasma display screen, an organic electroluminescent display screen, or other flat panel electronic displays. The integration of electronic displays with touch screen input devices is known, the specifics of which depend on the type of display and touch device being used. A touch screen device can be a capacitive device, a resistive device, an optical device, a force sensing device, or a surface acoustic wave device, and may include an X-Y electrode grid, force sensors, infrared diodes and sensors, or an array of electrode bars.

Monitor panel 12, as shown in FIG. 1, includes a front surface 20 into which a monitor screen is integrated, and a rear panel surface 22 to which the monitor assembly support members are typically secured. Monitor panel 12 may be divided into upper and lower halves 24 and 26 vertically divided by a horizontal centerline A. Monitor panel 12 may also be vertically divided into first and second panel halves 28 and 30 defined by a vertical centerline B. Centerlines A and B generally define four quadrants I, II, III and IV of the monitor panel which may be relevant to the placement of the support members to the monitor panel as it relates to stability of the monitor assembly. In the various embodiments shown, the center lines A and B can be geometric center lines that divide the monitor into symmetric halves, can be weight distribution center lines that divide the monitor into halves of equal weight and/or halves with symmetric centers of gravity, or can divide the monitor into any other suitable configuration that may be meaningful in considering stability.

In this embodiment, monitor panel 12 is generally rectangular-shaped. In other embodiments, monitor panel 12 may have other shapes, for example, circular, hemispherical, triangular, or a shape with five or more sides, so long as the monitor panel 12 is able to integrate a monitor screen with touch input capabilities. In other alternative-shaped embodiments, the monitor panel 12 may still be divided into generally upper and lower halves and first and second halves defined by generally horizontal and vertical centerlines, such as centerlines A and B shown in FIG. 1.

Monitor base 14 includes a front side 40, a rear side 42, a first side 44, and a second side 46 that define a generally rectangular-shaped member. Monitor base 14 has a length L between front and rear sides 40 and 42, and a width W measured between first and second sides 44 and 46. The width and length of base 14 define a footprint of the monitor assembly selected to satisfy stability requirements. For example, the length L between front and rear sides 40 and 42 extends to counterbalance moment and torque forces translated through support members 16 and 18. Similarly, the width W between first and second sides 44 and 46 extends to counterbalance moment and torque forces, especially those at or near the upper and lower corners of monitor panel 12.

Width W, as shown in FIG. 1, can be centered about the vertical centerline B of monitor panel 12 so that the monitor assembly is in balance when in the rest position prior to touch inputs being made to monitor panel 12. Monitor panel 12 can be positioned relative to base 14 so that a necessary portion of the base length L extends in front of and rearward of the position of monitor panel 12 so that the monitor assembly is able to reside in balance prior to touch inputs being made to monitor panel 12. In some embodiments, the height H measured between a generally upper surface 48 and a lower surface 49 of base 14 can be significant. Height H may be relevant when considering how the moment and other forces are translated from a touch input to the monitor panel through the upper and lower support members and into monitor base 14. For example, in configurations where the ratio of the height H to the length L or the ratio or the height H to the width W is relatively large, H may be a significant factor in determining stability.

In other embodiments, base 14 may have a shape different from the rectangular shape of FIG. 1. For example, the base width W may vary along base length L. In another embodiment, base 14 may be circular or oval-shaped, the base height H may vary across the base width W and length L, or may have more than four sides, for example, to match a multi-sided shape of the monitor panel 12 in an alternative monitor panel configuration.

In some embodiments, base 14 may include a weighted plate, keyhole plate, or other type of additional feature strategically placed within base 14 to provide for stability and/or security. For example, a weighted plate may be secured to a bottom surface 49 of base 14 so as to be concealed from view while providing additional stability. In other embodiments, a weighted plate or shaped weights may be integrally formed into base 14, for example, by injection molding base 14 around a metal or metal alloy plate or other shaped weight. In yet further embodiments of base 14, materials may be added to the bottom surface of base 14 that would create a high friction interface between base 14 and a surface on which the monitor assembly 10 resides, to improve stability of the monitor. For example, a specialized material may be an adhesive or may be shaped in the form of pads, suction cups or the like design, possibly placed at strategic points near or around the periphery of base 14.

The lower support member 18 includes a first end 50, a second end 52, a first side 54 and a second side 56. Lower support member 18 is secured to monitor panel 12 at two or more attachment points 58 and 60 that are located along first end 50 at or near first and second sides 54 and 56, respectively. Lower support member 18 is secured to base 14 at second end 52. It is common for known monitor assemblies to include only a single support member to support the monitor panel and connect the panel to the base. In many known monitor assemblies, the monitor panel is rotatably mounted to the support member. The rotatable mounting configuration of known monitor assemblies allows a user of the monitor assembly to adjust the viewing angle of a monitor screen on the front surface of the monitor panel. However, despite the advantages of having a rotatably adjustable monitor panel, such a configuration typically lacks stability during touch inputs if a touch screen is integrated with such a monitor.

To assist in providing stability in monitor assembly 10 having touch input capabilities, the monitor assembly includes an upper support member 16. Upper support member 16 includes a first end 70, a second end 72, a first side 74, and a second side 76. Upper support member 16 is secured to monitor panel 12 at two or more attachment points 78 and 80 located along first end 70 at or near first and second sides 74 and 76, respectively. Upper support member 16 is secured to base 14 at second end 72, at a location generally rearward along base length L from the connecting point of lower support member 18 to base 14. Upper support member 16 is preferably symmetrically positioned about vertical centerline B of monitor panel 12 so that forces from touch inputs to a touch screen of the monitor panel are more evenly distributed through support member 16 into base 14. Upper support member 16 assists in stabilizing the monitor assembly when touch inputs are made in either the upper half 24 or the lower half 26 of the monitor panel.

Preferably, upper support member 16 is secured to the upper half 24 of monitor panel 12 and the lower support member 18 is secured to the lower half 26 of panel 12. Furthermore, it is preferred that the attachment points 58, 60, 78 and 80 of the upper and lower support members are each located in a separate quadrant I–IV of the monitor panel 12, as shown in FIG. 1.

In this embodiment, the upper and lower support members 16 and 18 are fixed in a particular position on both the monitor panel 12 (with attachment points in each of the four quadrants) and the monitor base 14, thus fixing monitor panel 12 in the generally upright position illustrated in FIG. 1. In other embodiments, the size and position of one or both of the upper and lower support members 16 and 18 may vary to change the fixed position of monitor panel 12 to an angled position relative to base 14. In yet further embodiments, shown and illustrated herein, upper and lower support members 16 and 18 may be adjustable and adjustably attached to panel 12 such that the position of monitor panel 112 relative to base 114 is adjustable by a user of the monitor assembly.

Figure 2:
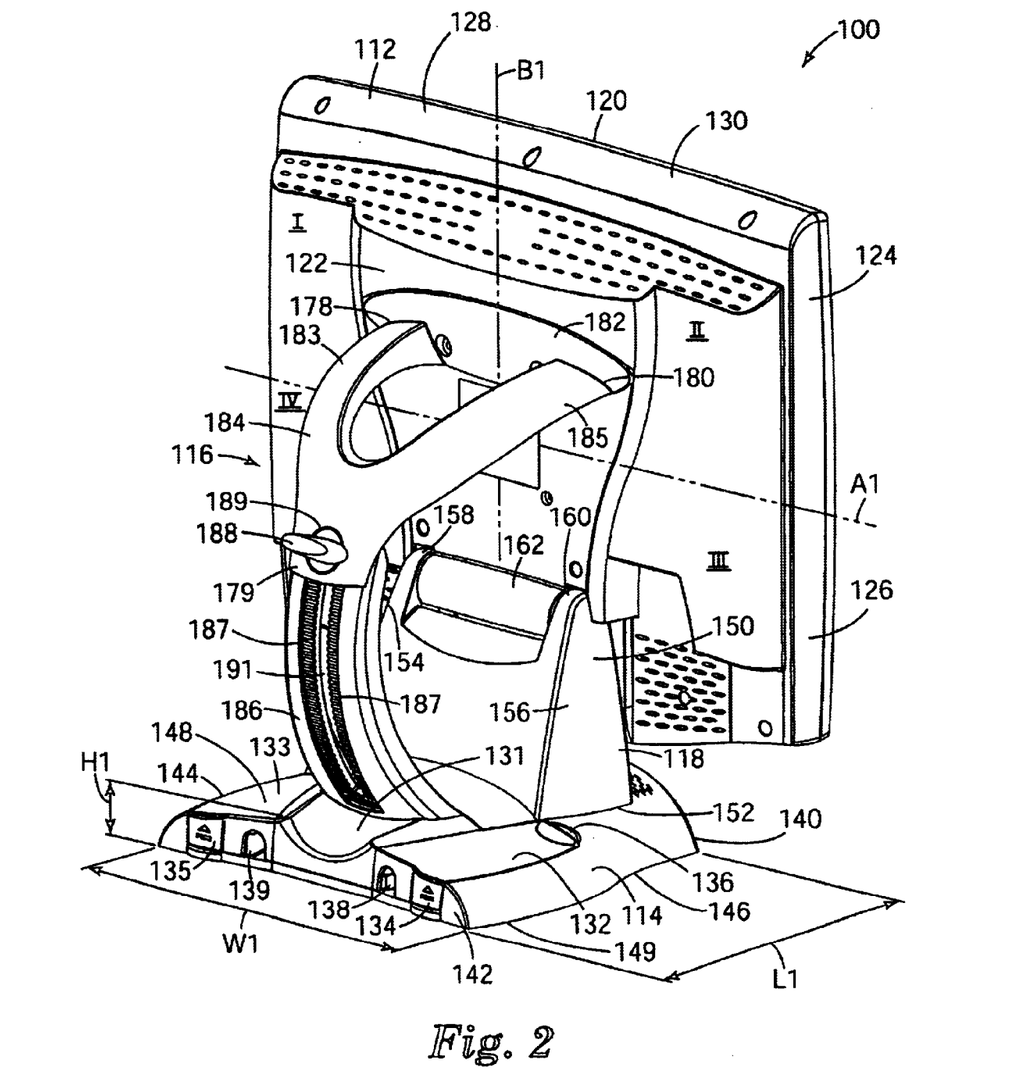
FIG. 2 is a rear perspective view of an alternative embodiment of a monitor assembly according to the invention.
Figure 3:
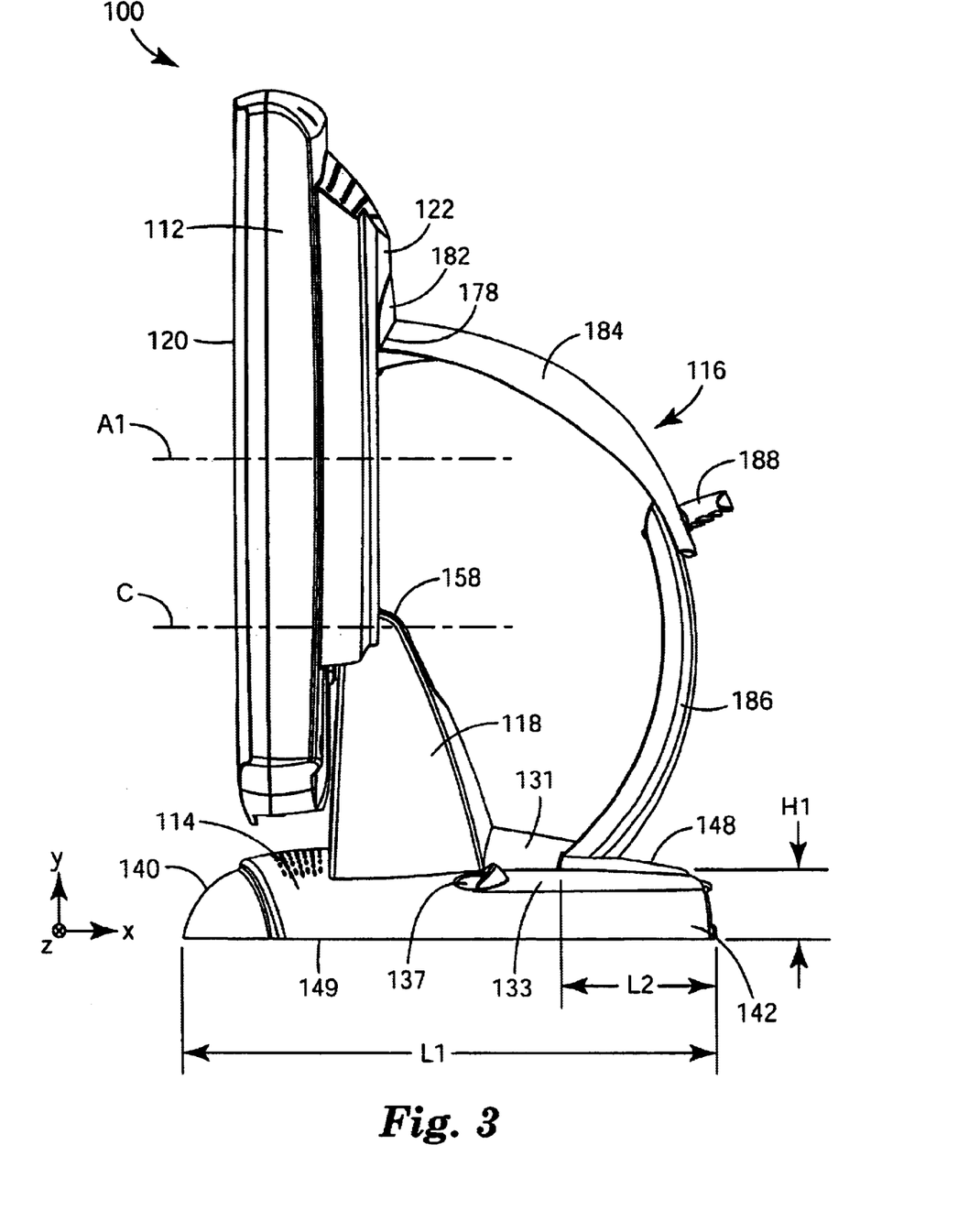
FIG. 3 is a side view of the monitor assembly of FIG. 2.

Referring now to FIGS. 2 and 3, an alternative monitor assembly 100 is shown having adjustment capabilities. Monitor assembly 100 includes a monitor panel 112, a monitor base 114, an upper support member 116, and a lower support member 118. The lower support member 118 is rotatably secured to panel 112 to allow rotation of panel 112 relative to base 114. Upper support member 116 is configured to lock and hold panel 112 in a given rotated position while providing necessary stability and support for the monitor assembly 100 when touch inputs are entered to a touch panel of the assembly.

Monitor panel 112 includes upper and lower halves 124 and 126 divided by a horizontal centerline A1, and further includes first and second halves 128 and 130 divided by vertical centerline B1. The horizontal and vertical centerlines A1 and B1 define quadrants I, II, III and IV of monitor panel 112. Panel 112 also includes a front surface 120 into which a monitor screen is integrated, and a rear surface 122 to which upper and lower support members 116 and 118 are mounted.

The monitor base 114 of monitor assembly 100 has a length L1 from a front end 140 to a rear end 142, and a width W1 between a first side 144 and a second side 146. Base 114 also has a height H1 between an uppermost surface 148 and a bottom surface 149. As shown in FIG. 3, front end 140 has a curved shape and upper surface 148 is contoured across the width and length of the base 114 W1. Width W1 varies between front end 140 and rear end 142 due to the contoured shape of the first and second sides 144 and 146. The contours and curved features of base 114 provide an aesthetically pleasing base member that maintains the stability of the monitor assembly when used in an upright position and when used at various angled positions relative to the base.

Base 114 also includes a cable management system for consolidating and arranging cables extending from monitor panel 112. The cable management system includes a first cover 132 and a second cover 133 that are removable from base 114 and cover a portion of apertures 136 and 137 formed in base 114. Covers 132 and 133 may be formed as a unitary member with connecting portion 131 extending between the two covers that can easily be removed with release tabs 134 and 135, or can be formed as separately removable items. When in use, cables secured to panel 112 extend through apertures 136 and 137, are captured by covers 132 and 133, and extend out through rear portion 142 of the base member from apertures 138 and 139 formed in either a rear portion of the base or from the cover members 132 and 133.

In addition to the cable consolidation and arrangement benefits of the cable management system, the cable management system may also be used to create a amount of slack in the cable between apertures 136 and 137 and an attachment point of the cables to monitor panel 112. Clipping or otherwise fixing the cable between the covers 132 and 133 and the base 114 may help maintain slack in the cable between the base and the monitor panel. This amount of slack (not shown) can allow the monitor panel to rotate between an upright position and an angled position relative to base 114 without a rearward or downward directed forces typically exerted by cables as they extend from a monitor panel to a power source, CPU, printer or other system. Thus, by ensuring an amount of slack in a cable attached to panel 112 using the cable management system of the present invention, the cable management system may, under certain circumstances, provide additional stability to the monitor assembly 100.

The lower support member 118 of monitor assembly 100 has a first end 150 rotatably attached to the monitor panel, and a second end 152 secured to base 114. Lower support member 118 provides at least two attachment points 158 and 160 that are horizontally spaced apart and positioned in separate quadrants IV and III in the lower half 126 of monitor panel 112.

The rotatable mounting of the panel 112 to lower support member 118 may be enabled using a shaft that extends between a first side 154 and a second side 156 of lower support member 118 that engages a laterally extending bore 162 on the rear surface 122 of panel 112. In another embodiment, feature 162 may include protrusions that extend horizontally outward from feature 162 and engage apertures formed in first end 150 of the lower support member. In another embodiment lower support member 118 is fixed to panel 112 and rotates relative to base 114.

Upper support member 116 includes a first portion 184 and a second portion 186 that adjustably mate with each other and secure panel 112 to base 114. First portion 184 is "Y" or yoke-shaped with a first arm 183 and a second arm 185 that each attach separately to panel 112 via an attachment plate 182 or other means. The point at which first and second arms 183 and 185 are secured to panel 112 defines attachment points 178 and 180. Preferably, attachment point 178 is in quadrant I and attachment point 180 is in quadrant II of upper half 124 of the panel. In other embodiments, first and second portions 183 and 185 connect directly to the monitor panel without an attachment plate 182.

First and second portions 183 and 185 come together to form a single neck portion 179 of first portion 184 that mates with second portion 186. The neck portion 179 includes an aperture 189 into which a thumb turn 188 is mounted for engaging adjustment features of the second portion 186.

Second portion 186 includes a track surface 187 adjacent a slot 191 formed along a length of second portion 186. A portion of thumb turn 188 engages the slot 191 and the adjustment features of track 187 to hold monitor panel 112 in an adjusted angled position relative to base 114. Thumb turn 188 may be configured in a variety of different ways to accomplish the same purpose of releasably securing the first portion 184 to the second portion 186. For example, the thumb turn 188 may be spring loaded such that the thumb turn must be pulled outwardly to disengage the features of track 187, thus allowing the first and second portions 184 and 186 to move relative to each other to alter a rotated position of panel 112. Thumb turn 188 may, in another embodiment, include a threaded shaft that extends through slot 191 and engages a threaded nut on an opposing side of second portion 186, such that rotation of thumb turn 188 causes adjustment features of first portion 184 to engage the adjustment features of track 187 to secure the first and second portions 184 and 186 together. In exemplary embodiments, the thumb turn can be easily disengaged, the monitor can be tilted, and the thumb turn can be re-engaged to secure the monitor at the desired angle of tilt, all while the user is gripping the thumb turn and using a single hand.

As shown in FIG. 3, first portion 184 has a curve or contoured shape that substantially matches the contour and shape of second portion 186. Further, first and second portions 184 and 186 are mounted to the panel and the base, respectively, in a specific direction that allows the first and second portion to maintain contact during rotation of panel 112 about lower support member 118. In other embodiments, the first and second portions of the upper support member need not be curved but may have linear features that perform the same function of allowing rotation of the monitor panel and locking the panel in a particular position relative to base 114.

Second portion 186 is secured to base 114 at a distance L2 from end 142. The distance L2 may vary depending on the shape and size of upper support member 116, the size and weight of panel 112, and the available rotation angles for the panel relative to the base.

The monitor panel 112 of monitor assembly 100 shown in FIGS. 2 and 3 may rotate between a generally upright position (0 degrees, as shown in FIGS. 2 and 3) and an angled position relative to base 114 of up to about 60 degrees. In other embodiments, monitor panel 112 may rotate between about −10 degrees to about 90 degrees with a few modifications to the embodiment illustrated in FIGS. 2 and 3. All positions of monitor panel 112 are stable under normal touch input forces at any location on a monitor screen that is integrated into a front surface of the monitor panel 112.

Touch forces exerted on monitor assembly 100 due to touch inputs to a touch screen of the monitor panel 112, may include X, Y and Z components (as defined by the axes shown in FIG. 3). Known monitor assemblies fail to provide adequate stability in the front-to-back and side-to-side directions particularly when touch forces are applied at the upper and outermost corners of the touch screen, and at various locations on the touch screen when the monitor panel is at an angled position relative to the base. Monitor assembly 100 provides a four point attachment configuration with upper and lower support members and a base design to provide and maintain stability for any touch input having any direction of force applied to the touch screen of the monitor panel 112.

Figure 4:
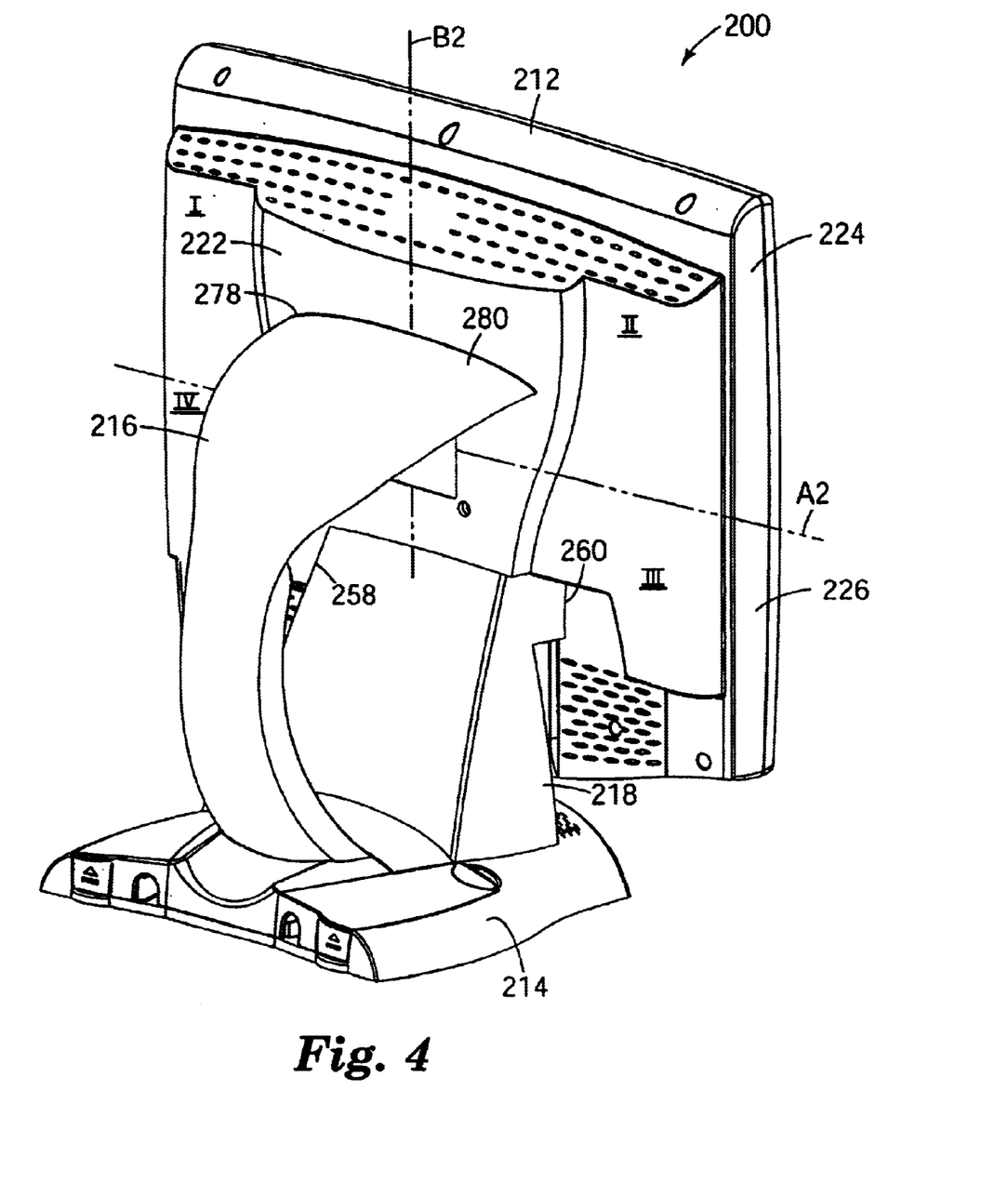
FIG. 4 is a rear perspective view of another alternative embodiment of a monitor assembly according to the invention.

Referring now to FIG. 4, a monitor assembly 200 is shown having an alternative upper and lower support member configuration. Monitor assembly 200 includes a monitor panel 212 and monitor base 214 similar to the corresponding features of monitor assembly 100. Assembly 200 includes an upper support member 216 that is integrated as a single unitary piece, such as the upper support member 16 of assembly 10. Assembly 200 also includes a lower support member 218 that is attached to panel 212 such that the panel is fixed in a predetermined position relative to base 214. As with assemblies 10 and 100, assembly 200 includes a four point attachment configuration with first and second contact points 258 and 260 of the lower support member positioned in separate quadrants IV and III of a lower half 226 of panel 212, and first and second contact points 278 and 280 of the upper support member positioned in separate quadrants I and II of an upper half 224 of the monitor panel 212. All four attachment points are located in separate quadrants I, II, III or IV defined by horizontal and vertical centerlines A2 and B2, respectively.

Monitor assembly 200 has enhanced stability compared to known monitor assemblies. The stability of assembly 200 is particularly relevant for a monitor panel having touch input capabilities. Assembly 200 is less susceptible to vibrations and reduces resonant oscillations due to repetitious touch inputs, as compared to known monitor assemblies with three or less attachment points on the monitor panel. Assembly 200 may reduce the magnitude and duration of vibrations due to touch inputs by providing improved damping of vibrations.

Figure 5:
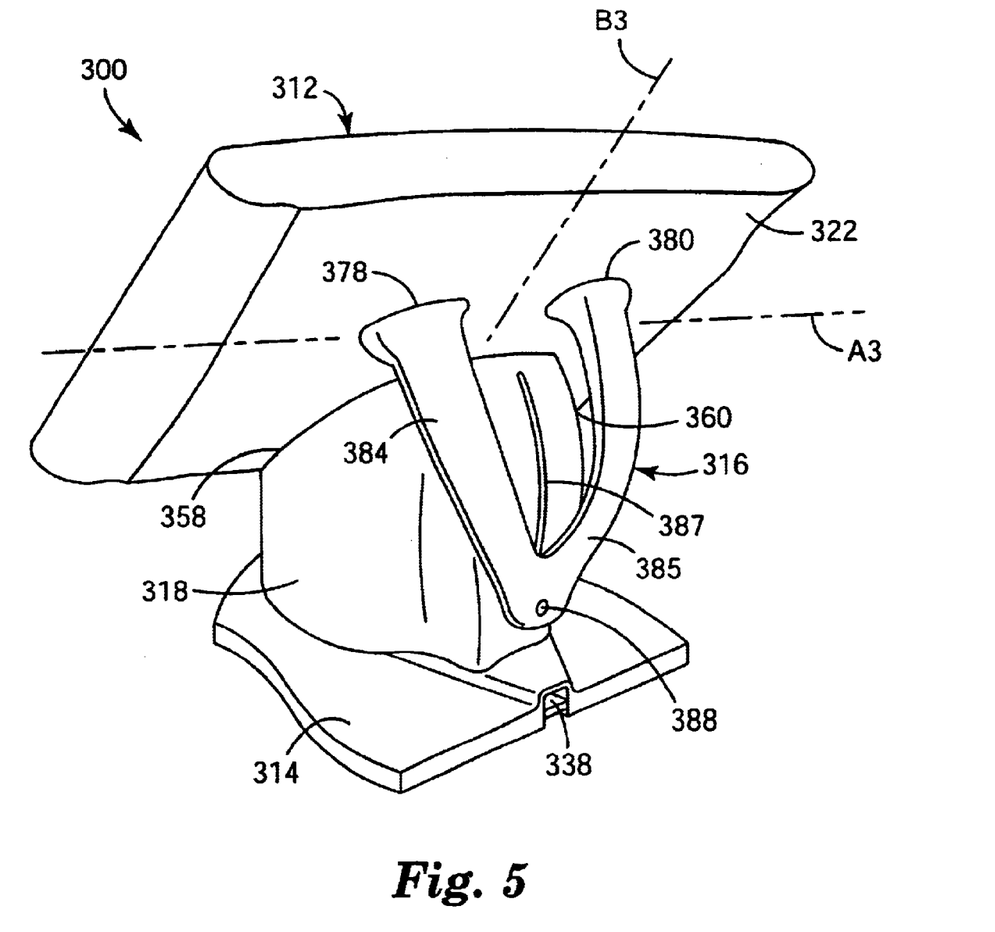
FIG. 5 is a rear perspective view of another alternative embodiment of a monitor assembly according to the invention.

Referring now to FIG. 5, an alternative embodiment of a monitor assembly 300 is shown. Assembly 300 includes a monitor panel 312, a base 314, an upper support member 316, and a lower support member 318. Monitor panel 312 and base 314 are similar to corresponding features of monitor assemblies 10, 100 and 200. Upper support member 316 is comparable to the upper support first portion 184 of assembly 100. Lower support member 318 integrates the comparable features of lower support member 118 as well as upper support second portion 186 of assembly 100.

The size and shape of lower support member 318, and the amount of surface area interfacing between the lower support member 318 and base 314 provides enhanced stability of monitor assembly 300. Lower support member 318 includes an engagement track or slot 387 that is engaged by a portion of thumb turn 388 that extends through a portion of upper support member 316. Thus, as thumb turn 388 engages or disengages track 387, the rotation of panel 312 relative to base 314 is controlled.

Upper support member 316 includes a Y or yoke-shaped design that is aesthetically pleasing while providing distinct two point attachment of the upper support member to panel 312 at attachment points 378 and 380. Lower support member 318 is also connected or attached to monitor panel 312 at two locations 358 and 360. FIG. 5 illustrates monitor panel 312 in an angled position, rotated at approximately 60 degrees from an upright position. The available angle of rotation of panel 312 is determined in part by the size and shape of lower support member 318, the size of upper support member 316, the length of track portion 387 formed in the lower support member 318, and the location of attachment points 358, 360, 378 and 380 on panel 312.

Monitor panel 312 is divided into four quadrants I, II, III and IV by horizontal centerline A3 and vertical centerline B3. The first portion attachment points 378 and 380 of upper support member 316 are in separate quadrants I and II, respectively. The attachment points 358 and 360 of lower support member 318 are in separate quadrants IV and III, respectively.

Monitor assembly 300 includes a cable management system where cables extending from a bottom or back portion of panel 312 extend through lower support member 318 and exit assembly 300 through aperture 338. According to this cable management system, the cables are concealed and consolidated in an aesthetically pleasing way. In some embodiments, lower support member 318 may have a hollow interior sufficient in size to maintain a certain amount of slack in the cables extending from the monitor panel so that the panel can rotate through its rotation angle without tension being exerted on the panel from the cables. A hollow interior of lower support member 318 may also be used to conceal a power brick of the power cord.

Figure 6:
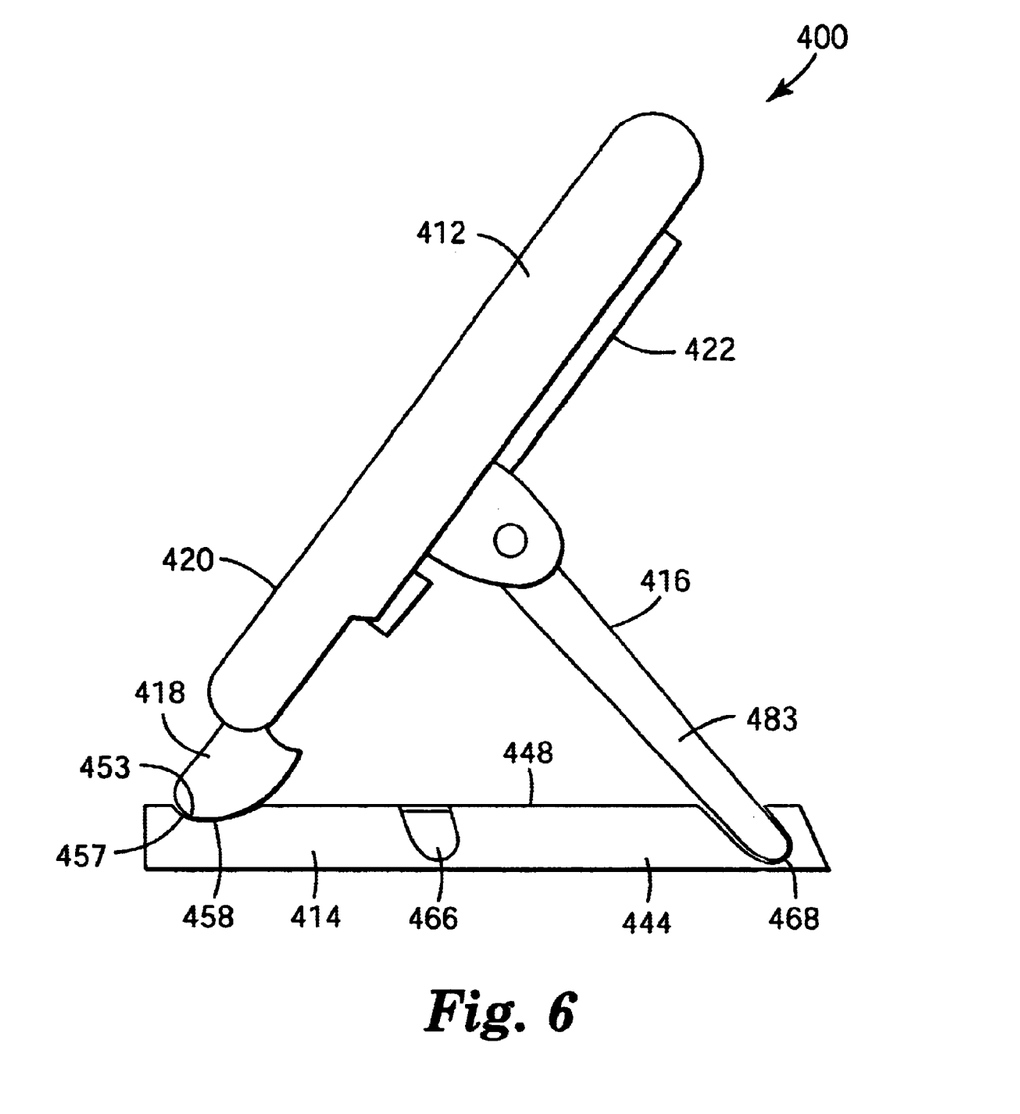
FIG. 6 is a side view of another alternative embodiment of a monitor assembly according to the invention.
Figure 7:
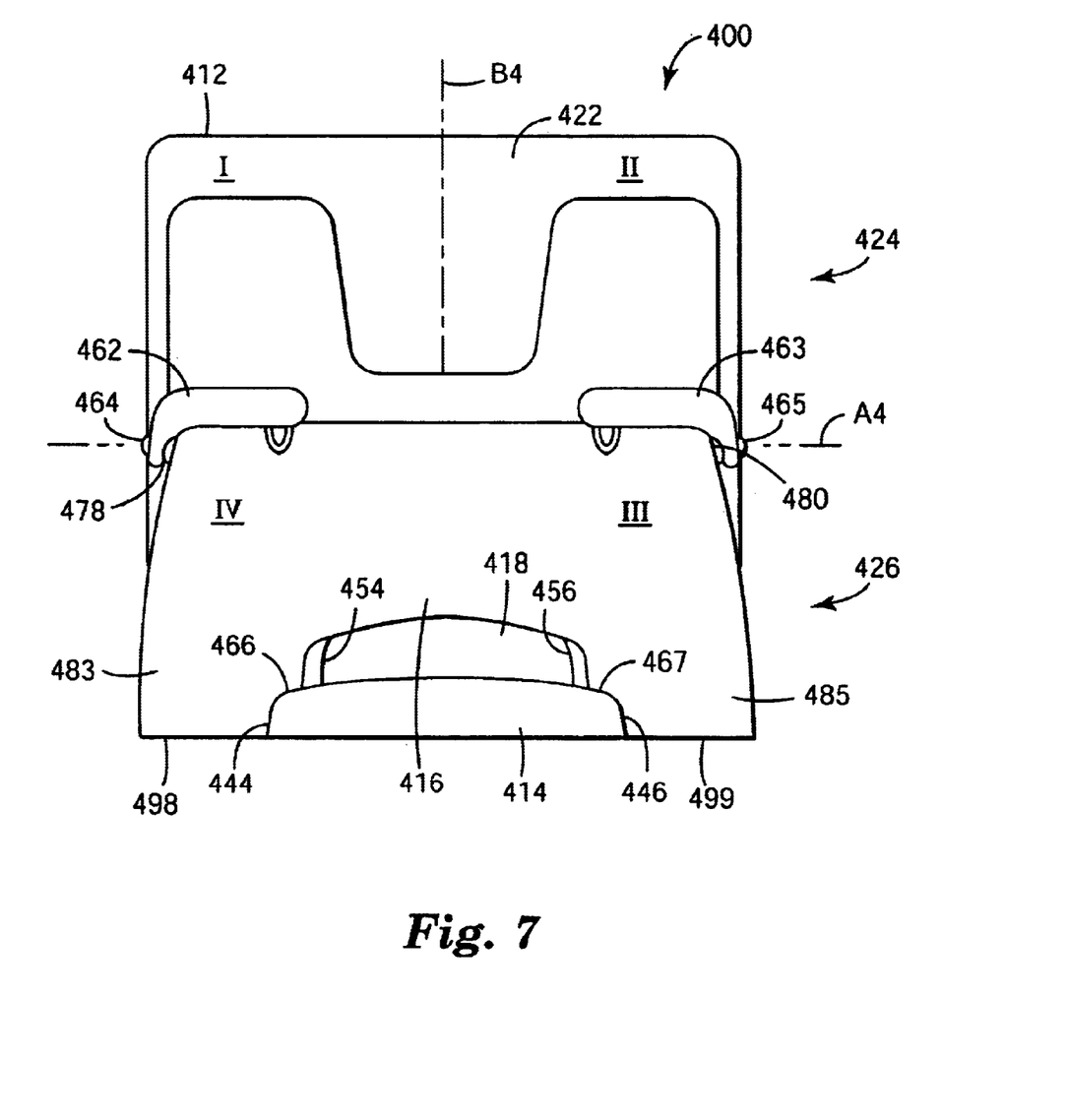
FIG. 7 is a rear view of the monitor assembly of FIG. 6.

Referring now to FIGS. 6 and 7, a monitor assembly 400 is shown having some alternative features of the present invention. Assembly 400 includes a monitor panel 412, a monitor base 414, an upper support member 416 and a lower support member 418. The support members 416 and 418 provide a four point attachment of the support members to panel 412 to provide necessary support and stability of the assembly when touch inputs are entered to a touch screen integrated into a front surface 420 of monitor panel 412.

Base 414 includes an upper surface 448, first and second sides 444 and 446, and retaining slots 466 and 468 that are formed in base 414 along first side 444 and corresponding retaining slots (not shown) that are formed in base 414 along second side 446. The retaining slots are provided in pairs with each slot of the pair of slots being aligned parallel to the other slot across a width of base 414 between first and second sides 444 and 446. The engagement slots are configured to receive a portion of first and second leg members 483 and 485 of the upper support member 416. Each pair of engagement slots, when engaging the first and second leg members, represents a different position for panel 412. In other embodiments, there may be fewer or more pairs of slots formed in base 414, with each pair of slots representing a different position for panel 412.

Upper support member 416 may be rotatably secured to panel 412 such that a high amount of torque is required to rotate member 416 relative to the panel. Upper support member 416 may further include a position stop feature that defines a fully extended position of the upper support member and limits an angle through which member 416 may rotate relative to the panel. Upper support member 416 may be rotated to a position that places leg member 483 and 485 away from base 414 so that the leg members do not engage a pair of slots in the base. When the leg members are positioned outside of the base slots, panel 412 may be angled even further from an upright position than that angled position shown in FIG. 6.

Further, the upper support member may stabilize the monitor panel even when the leg members are disengaged from the slots. Stabilization of the panel may be enabled by the high torque connection of the upper support member to the panel that holds the panel in a given rotated poison. The panel may also be help in a stable position when the upper support member is fully extended and held from further extension by the position stop. In use, the rearward positioned pair of slots may, for example, provide for a 45 degree rotation of panel 412 from an upright position, while the fully extended position of the upper support member may provide for a 65 degree rotation of panel 412 from the upright position.

When leg members 483 and 485 are retained within slots 466 and 468, monitor panel 412 is in a generally upright position, perpendicular to base 414. When members 483 and 485 are retained within slots 467 and 469, monitor panel 412 is in an angled position relative to an upright position of the panel. In order for upper support member 416 to provide support for panel 412, it must engage one of the pairs of slots in base 414.

The upper surface 448 of base 414 includes a contact portion 457 that engages a rotation surface 453 of lower support member 418 so that lower support member 418 is able to rotate relative to base 414, but does not inadvertently lose contact with the base. In other embodiments, lower support member 418 may be rotatably secured to base 414 in a different manner, such as by the pin and aperture design used for securing upper support member 416 to panel 412.

Monitor panel 412 is divided into four quadrants I, II, III and IV, that are defined by horizontal and vertical centerlines A4 and B4 of the panel. Attachment points 458 and 460 are maintained between base 414 and the lower support member 418 at first and second sides 454 and 456 of the lower support member in separate quadrants IV and III of a lower half 426 of panel 412. Attachment points 478 and 480 between upper support member 416 and panel 412 are positioned at or above centerline A3 in separate quadrants I and II of upper half 424 of panel 412.

Rear surface 422 of panel 412 may include brackets 462 and 463 configured to receive attachment features such as pins 464 and 465, respectively, of the upper support member 416. Attachment features 464 may extend through horizontally aligned apertures of the brackets 462 and 463 so that the monitor panel is able to rotate relative to the upper support member 416, and thus rotate relative to base 414.

Figure 8:
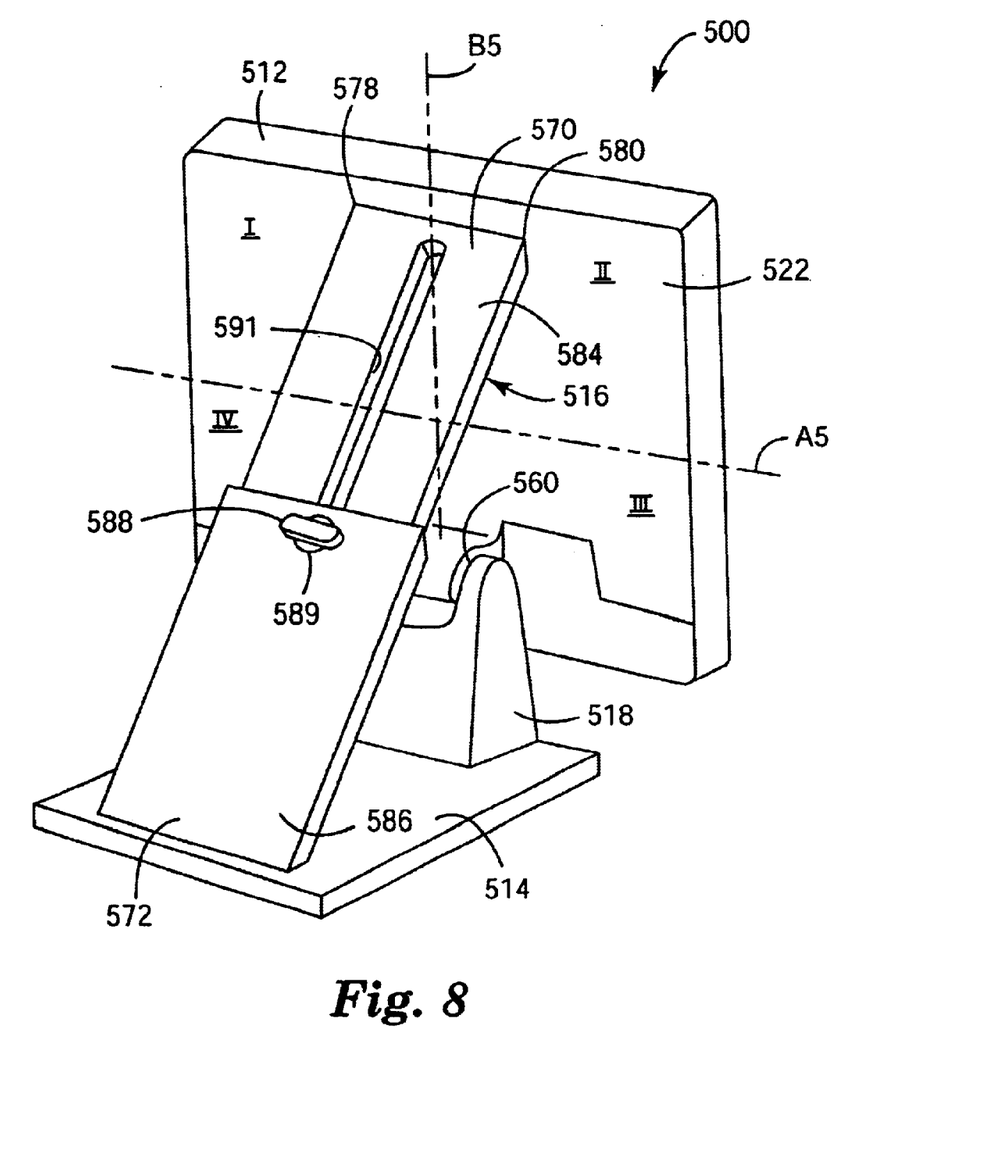
FIG. 8 is a rear perspective view of another alternative embodiment of a monitor stand assembly according to the invention.

Referring now to FIG. 8, a monitor assembly 500 is shown having an alternative adjustable upper support member 516 configuration. Monitor assembly 500 includes a monitor panel 512, a base 514 and a lower support member 518 that are similar to corresponding members of assemblies 10, 100 and 200. The lower support member 518 is fixed to base 514 and is rotatably secured to panel 512 at two attachment points, one of which attachment points 560 is shown. The upper support member 516 includes a first portion 584 and a second portion 586 that adjustably mate with each other and secure panel 512 to base 514. A first end 570 of upper support member 516 is secured to panel 512 at attachment points 578 and 580. A second end 572 of upper support member 516 is secured to base 514 rearward of the attachment point of lower support member 518 to base 514.

As shown in FIG. 8, first portion 584 is insertable into second portion 586 to allow rotation of monitor panel 512 about lower support member 518. Second portion 586 includes an aperture 589 into which a thumb knob 588 is inserted to engage a slot 591 formed in first portion 584. Thumb knob 588 is adjustable to release the first and second portions so they can move relative to each other, and to hold the first and second portions together to retain panel 512 in a given position relative to base 514.

In order for the first and second portions to move relative to each other, the attachment points of upper support member 516 to the panel (at first end 570) and to the base (at second end 572) must be rotatable. The attachment point 560 of lower support member 518 to the panel must also be rotatable to allow the first and second portions to rotate as the panel rotates relative to the base. An example of a rotatable attachment of an upper support member to a monitor panel is shown in FIGS. 6 and 7, and may be used as the rotatable attachment for upper support member 516 to panel 512 and base 514. In other embodiments, the configurations of the first and second portions 584 and 586 may be reversed so that second portion 586 is insertable into first portion 584.

Monitor assembly 500 may also require that one or both of the first and second portions 584 and 586 of upper support member 516 must be able to move both rotatably and linearly relative to the panel and base. For example, a vertical slot may be formed on an upper half of the rear surface 522 of panel 512 that extends parallel to centerline B5 and is configured to receive end 570 of the upper support member. The vertical slot may be associated with a locking feature similar to thumb knob 588, that engages end 570 to lock the upper support member in a given vertical position on the panel. When adjusting the rotated position of panel 512 relative to base 514, thumb knob 588 and the locking feature of end 570 would be released, the panel position adjusted by allow both member 584 to slide relative to member 586 and allowing end 570 to move within the vertical slot on the panel, and the thumb knob and locking feature tightened again to hold the panel in the adjusted position. A similar slot may be formed in base 514 that is associated with a locking feature that locks end 572 and provides similar adjustment capabilities as the slot formed in panel 512 described above.

In a yet further embodiment, lower support member 518 may be movable relative to base 514, for example in a slot formed in base 514 that is aligned with the upper support member. Providing a second linear motion via the lower support member in addition to the linear motion between members 584 and 586 as they move relative to each other permits rotation of the panel from an upright position.

The location at which the first and second portions of upper support member 516 are secured to panel 512 and base 514 may be configured so that the first and second portions move into or out of the panel or base. For example, panel 512 may have a sufficient thickness between a front surface and rear surface of the panel so that an aperture may be formed in the rear surface of the panel that allows for end 570 of the upper support member to be inserted into the panel a given distance. A locking feature would be associated with the aperture in the panel to lock the upper support member in a given inserted position in the panel. Thus, when adjusting the rotated position of the panel, the thumb knob 588 is released, the locking feature associated with the aperture is released, members 584 and 586 are moved relative to each other, and the thumb knob and locking feature are tightened to lock the panel in a given position. A similar aperture could be formed in base 514 if the base was provided with a thickness sufficient to allow end 572 of the upper support member to be inserted into the base and adjusted to different inserted positions within the base.

Monitor panel 512 may be divided into four quadrants I, II, III and IV by horizontal centerline A5 and vertical centerline B5. The first portion attachment points 578 and 580 of upper support member 516 are in separate quadrants I and II, respectively. The attachment points of lower support member 518 are in separate quadrants IV and III, respectively.

Figure 9:
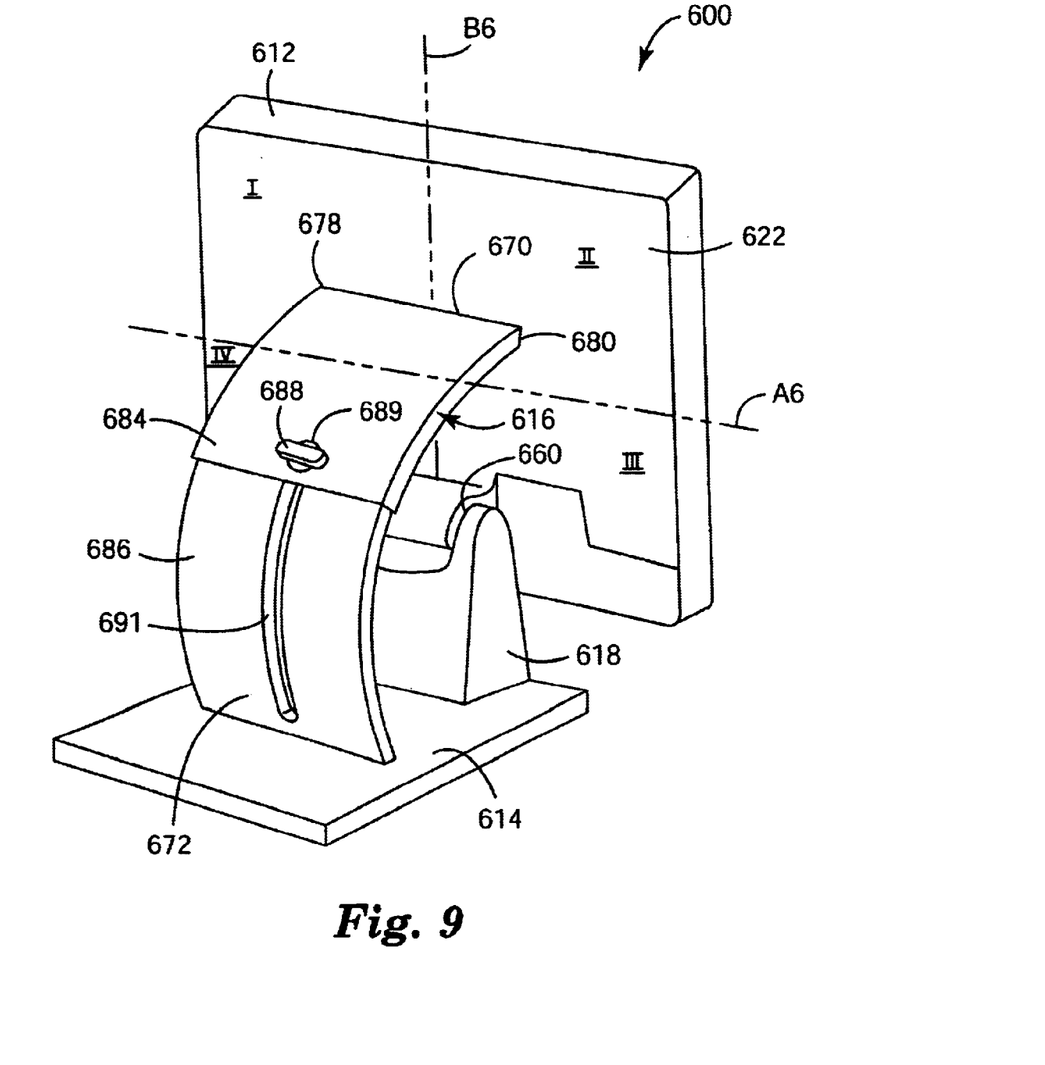
FIG. 9 is a rear perspective view of another alternative embodiment of a monitor stand assembly according to the invention.

Referring now to FIG. 9, a monitor assembly 600 is shown having an alternative adjustable upper support member 616. Monitor assembly 600 includes a monitor panel 612, a base 614 and a lower support member 618 that are similar to corresponding members of assemblies 100, 200 and 500. The lower support member 618 is secured to base 614 and is rotatably secured to panel 612 at two attachment points, including attachment point 660. The upper support member 616 includes a first portion 684 and a second portion 686 that adjustably mate with each other and secure panel 612 to base 614. A first end 670 of upper support member 616 is secured to panel 612 at attachment points 678 and 680. A second end 672 of upper support member 616 is secured to base 614 rearward of the attachment point of lower support member 618 to base 614.

As shown in FIG. 9, second portion 686 is insertable into first portion 684 to allow rotation of monitor panel 612 about lower support member 618. First portion 686 includes an aperture 689 into which a thumb knob 688 is inserted to engage a slot 691 formed in second portion 684. Thumb knob 688 is adjustable to release the first and second portions so they can move relative to each other, and to hold the first and second portions together to retain panel 612 in a given position relative to base 614.

Monitor panel 612 is divided into four quadrants I, II, III and IV by horizontal centerline A6 and vertical centerline B6. The first portion attachment points 678 and 680 of upper support member 616 are in separate quadrants I and II, respectively. The attachment points of lower support member 618 are in separate quadrants IV and III, respectively.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A touch input monitor comprising:
   a monitor panel having a front surface integrating a monitor screen and a rear surface;
   a base;
   a lower support member secured to the base and pivotally secured to the rear surface of the monitor panel for tilting the monitor panel relative to the base; and
   an upper support member comprising a first portion secured to the rear surface of the monitor and a second portion secured to the base, the first portion and second portion adjustably engaging each other to allow tilting of the monitor panel about the lower support member, wherein one of the first portion and second portion comprises an aperture and the other of the first portion and second portion comprises a slot aligned with the aperture such that a fastener inserted through the aperture engages the slot to releasably secure the first and second portions together, wherein the slot comprises ribs that mate with a mating surface of the opposing first portion or second portion to prevent relative movement between the first portion and the second portion when the fastener is tightened.

2. The touch input monitor of claim 1, wherein the monitor screen comprises a touch panel.

3. The touch input monitor of claim 1, wherein the monitor panel tilts between about 0 to 60 degrees relative to an axis perpendicular to the base.

4. The touch input monitor of claim 1, wherein the base includes a cable management system comprising apertures formed in the base to receive cables and a cover removably secured to the base that captures the cables between the cover and base.

5. The touch input monitor of claim 1, wherein the first portion of the upper support member is secured to the monitor at two points and the lower support member is secured to the monitor at two points.

* * * * *